Figure 1:
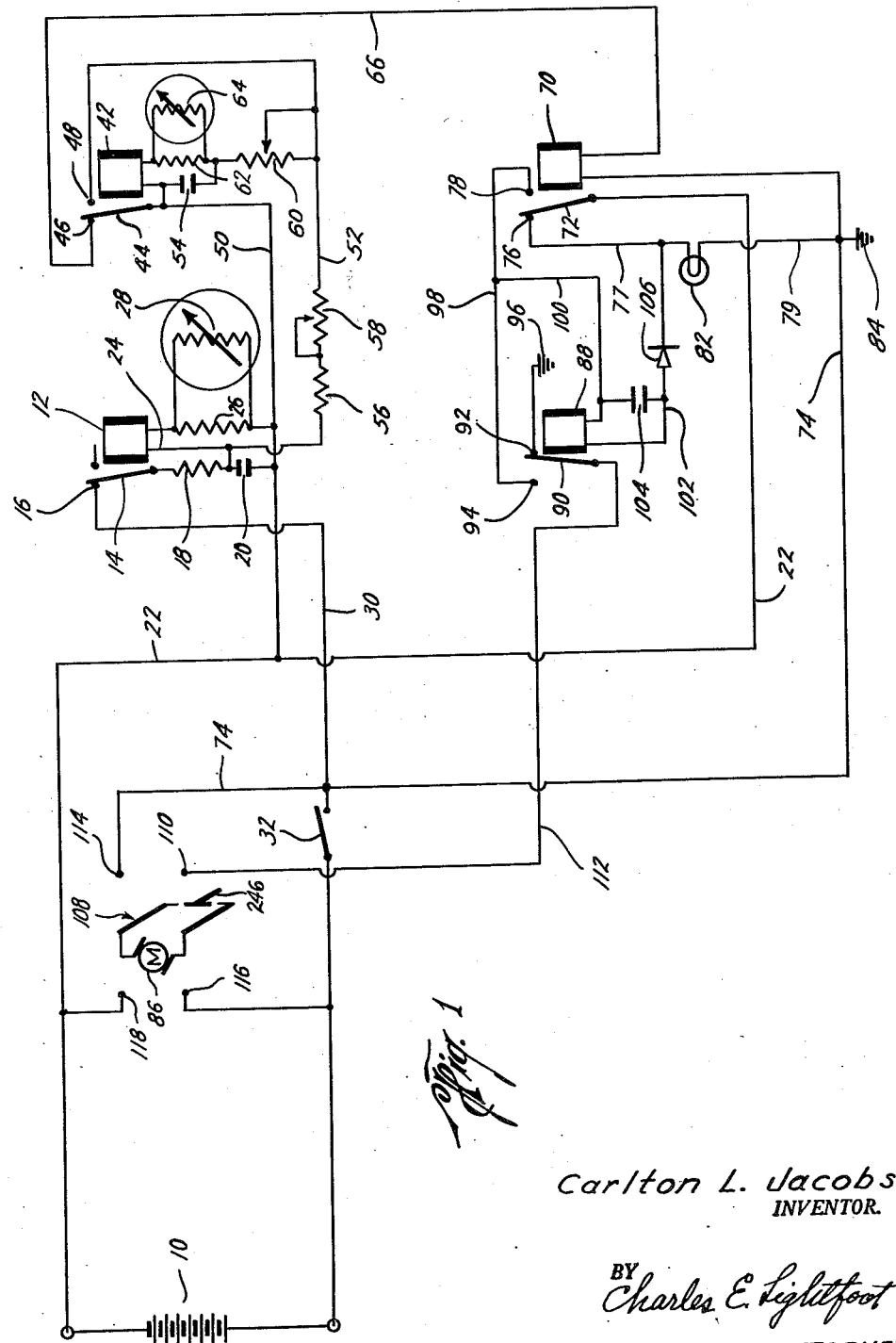

June 25, 1957 C. L. JACOBS 2,797,342
ELECTRICAL BEACON EQUIPMENT
Filed March 17, 1954 2 Sheets-Sheet 2

Carlton L. Jacobs
INVENTOR.

BY Charles E. Lightfoot
ATTORNEY

United States Patent Office 2,797,342
Patented June 25, 1957

2,797,342

ELECTRICAL BEACON EQUIPMENT

Carlton L. Jacobs, Houston, Tex.

Application March 17, 1954, Serial No. 416,773

10 Claims. (Cl. 307—132)

This invention relates to electrical beacon equipment, and more particularly to electrical timing mechanism employed in flashing beacons.

The invention finds particular application in connection with electrical beacon equipment of the flashing type, which must be capable of dependable operation over long periods of time, and in which the on and off periods of the light must be accurately determined and are of relatively short duration. It will be understood, however, that the invention is not limited to the particular use set forth herein, but is capable of wide application and may be used in any suitable kind of equipment in whose operation accurate timing is an important factor.

Attempts have been made to provide mechanical timing mechanism of increased efficiency and reduced power consumption by eliminating motor driven mechanism by the use of relays, or other means operable at low rates of power consumption, but the accuracy and dependability of such expedients have been unsatisfactory due to variations in the timing, resulting from changes in temperature, variations in the potential of the power source, or other variable factors.

The present invention has for an important object the provision of electrical beacon equipment whereby the above disadvantages are overcome and which embodies timing mechanism which is accurate and dependable in operation and in which the accuracy of the timing is substantially unaffected by temperature variations throughout a wide range of temperature change.

Another object of the invention is to provide electrical beacon equipment embodying timing mechanism whose accuracy is substantially unaffected by relatively great variations in the potential of the source of electrical power employed.

A further object of the invention is the provision of electrical beacon equipment of compact design, which is capable of operation at a substantial reduction in power consumption over that which is obtainable with beacon equipment of conventional construction and which is dependable in operation over long periods of time without requiring frequent maintenance or attention.

Another object of the invention is to provide electrical timing equipment of simple design, which may be readily constructed to meet any desired timing requirements and which is accurately adjustable throughout a wide range of time variation.

A still further object of the invention is the provision of portable electrical beacon equipment which is of rugged construction, capable of withstanding the rough handling and extreme conditions of exposure to which such equipment is customarily subjected.

The above and other important objects and advantages of the invention will best be understood from the following detailed description, constituting a specification of the same, when considered in conjunction with the annexed drawings, wherein—

Figure 2:
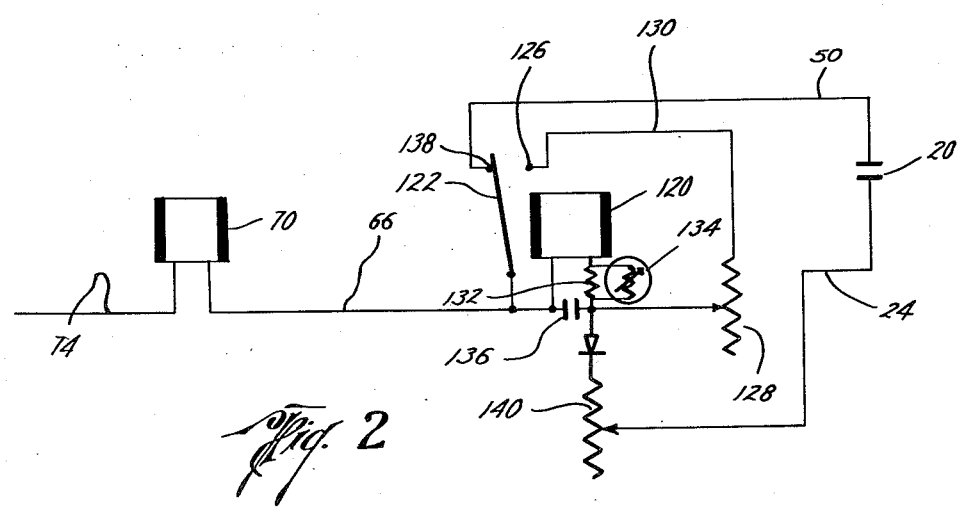

Figure 1 is a circuit diagram illustrating a preferred form of electrical circuit employed in the invention; and Figure 2 is a circuit diagram illustrating a somewhat modified form of the electrical timing means of the invention.

Referring now to the drawings in greater detail, the invention comprises several electrical circuits, as illustrated in Figure 1, connected to a common source of electrical current, such as a battery of suitable voltage, indicated at 10, one of the circuits constituting means for maintaining a constant electrical potential and including a relay having a coil 12, and an armature 14, which is arranged to move into and out of contact with a contact 16. The armature 14 is connected to a fixed resistance element, which is in turn connected to one side of a condenser 20 of suitable capacity, whose other side is connected to the battery 10 by the conductor 22. One side of the condenser 20 is also connected to the coil 12 by the conductor 24, and the other side of the condenser is connected in series with a resistance element 26 which is in turn connected to the coil 12. Across the resistance 26 there is a temperature responsive resistance element or thermistor 28 whose resistance increases and decreases with the temperature. The contact 16 is connected to the battery 10 by the conductor 30, through a switch 32.

The above described circuit constitutes the means by which a current of constant potential is maintained for the operation of the timing mechanism.

Upon closing of the switch 32, with the armature 14 in contact with the contact 16, it will be seen that current from the battery 10 flows through the conductors 22 and 30 to charge the condenser 20, which feeds the coil 12, and as soon as the charge reaches a predetermined value, the coil 12 will be effective to attract the armature 14 to move the armature out of contact with the contact 16, whereupon the supply of current to condenser 20 is shut off. Current may then flow from the condenser through the resistances 26 and 28 and through the coil 12 until the condenser is discharged to the point at which the coil will no longer hold the armature 16, whereupon the armature will move into contact with the contact 16 and current will again be supplied to the condenser from the battery. By this sequence of operations the condenser 20 is maintained at all times charged to supply current at a constant potential to the timing circuit hereinafter described.

Current from the constant potential supply circuit described above is supplied to the timer output circuit of the invention which includes a relay having a coil 42 and an armature 44 which is movable into and out of contact with the contact elements 46 and 48. The coil 42 is supplied with current through conductors 50 and 52 which are connected to the condenser 20, the conductor 50 being also connected to the armature 44 and to one side of a condenser 54. Connected into the conductor 52 are fixed and variable resistance elements 56 and 58, respectively, and between the resistance 58 and the coil 42 a variable resistance 60 and a fixed resistance 62 are connected in series. Across the resistance 62 a thermistor 64 is connected in the same manner and for the same purpose as the thermistor 28 is associated with the resistance 26 previously described. Conductor 52 is also connected to the contact 48 and a conductor 66 leads from the contact 46 to a load circuit, later to be described in detail.

The above described timing circuit is in off condition when the armature 44 is in the position illustrated in Figure 1, in contact with the contact 46, and in this condition of the circuit the condenser 54 is being charged through the conductors 50 and 52. As soon as the condenser 54 has been charged to a predetermined potential the coil 42 will be activated to attract the armature 44 away from the contact 46 and into contact with contact 43, whereupon current ceases to be supplied through conductor 66 to the load circuit and the condenser 54 will be discharged through the coil 42 and resistances 62 and 64 and also through the variable resistance 60. By suitably adjusting the resistance 60, the time required to discharge the condenser may be regulated as desired to determine the off time of the load circuit.

Upon discharge of the condenser 54, the coil 42 is inactivated to permit the armature to move out of contact with contact 48 and into contact with contact 46, whereupon condenser 54 will again be charged through conductors 50 and 52. The time required to recharge the condenser 54 and activate the coil 42 may be adjusted with any degree of accuracy by suitably adjusting the variable resistance 58, to determine the on time of the lamp circuit.

The load circuit of the invention includes a relay having a coil 70 and an armature 72, one terminal of the coil 70 being connected to the contact 46 by the conductor 66 and the other terminal thereof being connected to the conductor 74 which is connected to the battery 10 by the conductor 30. The relay has a contact 76 with which the armature 72 is in contact when the coil 70 is deenergized and a contact 78 with which the armature makes contact when the coil 70 is energized. Contact 76 is connected directly to a lamp 82 through a conductor 77, and the lamp is also connected to ground as indicated at 84 and to the conductor 74, through a conductor 79.

A motor 86 may be provided for actuation of suitable lamp changing mechanism of conventional design, not shown, which may be employed with the beacon equipment, which motor is preferably of the permanent magnetic field type, and the operation of the motor is controlled by the load circuit relay in conjunction with a motor control relay, having a coil 88 and an armature 90 which makes contact with a contact 92 when the coil 88 is energized and with a contact 94 when coil 88 is deenergized. Contact 92 is connected to ground as indicated at 96. Contact 94 is connected to contact 78 through a conductor 98 and to one side of coil 88, through a conductor 100. Coil 88 is also connected to the lamp 82 through a conductor 102. A condenser 104 is connected between the conductors 100 and 102, and a diode 106 is connected in series with the condenser 104, so that current may flow from contact 78 to ground 84, to charge the condenser through the lamp 82, but current is prevented from flowing from contact 76 to the condenser through conductor 102.

The lamp changer motor 86 is arranged to be operated forwardly and in reverse and for this purpose a reversing switch 108 is provided, having a contact 110 which is connected through a conductor 112 to the armature 90 and a contact 114 connected to conductor 74. The reversing switch 108 has an operating lever 246 whereby it may be manually operated. The switch also has contacts 116 and 118 connected to the battery 10.

In one position of the switch 108, conductors 74 and 112 are connected to the motor 86 to cause the motor to operate in a direction to actuate the lamp changing mechanism to replace a burned out lamp, and in the other position of the switch the motor is connected to the battery in a manner to cause the motor to run in a reverse direction.

During normal operation of the beacon, when the lamp is on, the armatures 72 and 90 will be in the positions illustrated. Under these conditions, current is flowing through conductors 22, 77, 79, and 74 to light the lamp, during the off time of the load relay which is the on time of the lamp, and is also the discharging time of condenser 54 of the timing circuit.

When the condenser 54 has discharged coil 42 will be deenergized and armature 44 will move from contact 48 to contact 46. Coil 70 will then be energized to move armature 72 away from contact 76 and into contact with contact 78, and the lamp will then be off. Current then flows through conductor 100 to charge condenser 104, through conductor 102, diode 106, lamp 82, and conductor 79 to ground. This charges condenser 104, but lamp 82 is not lighted due to the resistance of coil 88 and diode 106. The coil 88 remains energized, however, as long as the lamp 82 completes the circuit so that armature 90 remains in contact with contact 92 and the motor 86 remains inoperative.

Should the lamp 82 burn out condenser 104 will no longer be charged and coil 88 will become deenergized to permit armature 90 to move into contact with contact 94, whereupon during contact of armature 72 with contact 78 current will flow through conductors 22, 98, armature 90, conductor 112, switch 108 and the conductor 74 to operate motor 86 to actuate the lamp changing mechanism to replace the lamp.

As soon as the circuit is closed by the new lamp, current flows through conductor 100 to recharge the condenser 104 and reenergize coil 88, whereupon armature 90 returns to contact 92 which short circuits the armature of the motor 86 through conductors 112 and 74 and ground connections 84 and 96, thus causing dynamic braking to stop the motor immediately so that the lamp is accurately positioned.

It will be noted that armature 72 continues to move back and forth between contacts 76 and 78, whether or not the lamp 82 is burned out.

A somewhat modified form of the timing circuit of the invention is illustrated in Figure 2, wherein the on and off time of the light are separately regulated without any interaction of the regulating means. This modified circuit includes a relay having a coil 120 and an armature 122, with which a switch 124 is simultaneously operable. The armature is movable upon energization of the coil 120 into contact with a contact 126, which is connected to a variable resistance element 128 by a conductor 130, which in turn is connected in series with a resistance 132 and coil 120. A thermistor 134 is connected across resistor 132, to compensate for electrical and mechanical changes in the circuit due to variations in temperature. The coil 120 is also connected to the armature 122, and a condenser 136 is connected in series with the coil and the resistor 132.

The armature 122 is movable upon deenergization of the coil 120 into contact with a contact 138 which is connected by the conductor 50 to one side of the condenser 20 of the previously described form of the invention, and the other side of the condenser 20 is connected by the conductor 24 with a variable resistance element 140 which in turn is connected in series with the resistor 132, coil 120 and armature 122. A diode 141 is also connected in series with and between the resistance elements 140 and 132, which serves to prevent discharging of condenser 136 through conductor 66 and coil 70 to ground, since conductor 24 also leads to ground.

The condenser 20 operates as a constant potential source of power for the coil 120, just as in the previously described form of the invention, and charging of the condenser 136 from condenser 20 results in energization of coil 120 sufficiently to attract armature 122 to move the armature into contact with the contact 126. The time required to accomplish this energization of coil 120 may be regulated as desired by adjustment of the resistor 140.

As soon as the armature moves out of contact with contact 138 the source of power 20 is disconnected from the relay, and when the armature makes contact with contact 126 the charge on the condenser 136 may flow through resistance 128 and coil 120 and also through resistances 132 and 134 and the coil 120, until the coil becomes deenergized sufficiently to release armature 122, whereupon the armature returns to contact 138. The time required for such deenergization of the coil 120 may be regulated as desired by adjustment of resistance 128. Armature 122 is connected to conductor 66, which leads to the coil 70 in the same manner as in the previously described form of the invention.

As illustrated in Figure 2, the armature 122 is in contact with contact 126 during the discharging time of condenser 136 and is in contact with contact 138 during the charging time of condenser 136.

It will thus be seen that the invention, constructed as described above, provides electrical beacon equipment of simple design and rugged construction, which is certain in operation, by which accurate timing can be accomplished, and whose operation is relatively independent of temperature changes. It will also be appreciated that the timing mechanism disclosed is capable of a wide range of uses in equipment of various types and is not limited to the specific purpose set forth herein.

The invention has been disclosed herein in connection with certain specific apparatus and electrical circuits employed, but it will be understood that this in intended by way of illustration only, and that numerous changes can be made in the construction and arrangement of the various parts, as well as in the manner in which the elements are connected, without departing from the spirit of the invention or the scope of the appended claims.

Having thus clearly shown and described the invention, what is claimed as new and desired to secure by Letters Patents is:

1. An electrical timing device comprising a condenser, a charging circuit for the condenser, a direct current source of supply for said circuit, electromagnetic means having an energizing winding, an armature connected into said charging circuit and movable to one position to open the charging circuit in response to a predetermined maximum energization of the winding and to another position to close said charging circuit in response to a predetermined minimum energization of the winding, a discharging circuit connected across the condenser and including said energizing winding and electrical resistance means connected in series with said winding and including temperature responsive resistance means whose resistance is variable in response to changes in temperature to vary the resistance of the discharge circuit to maintain a constant rate of discharge of the condenser.

2. An electrical timing device comprising a condenser, a direct current charging circuit and a discharging circuit connected across the condenser, electromagnetic means having an armature connected into the charging circuit and movable to one position to open the charging circuit and to another position to close the charging circuit and having an energizing winding connected into the discharging circuit and operable to cause the armature to move to said one position in response to a predetermined maximum voltage across the condenser and to said other position in response to a predetermined minimum voltage across the condenser, said discharging circuit also including temperature responsive resistance means connected in series with said energizing winding whose resistance is variable in response to changes in temperature to vary the resistance of the discharging circuit to maintain the rate of discharge of the condenser constant.

3. In electrical timing mechanism an electromagnetically operable timing device including an energizing winding, and means for intermittently supplying an electrical current at a predetermined maximum voltage to said winding comprising a condenser, a direct current charging circuit and a discharging circuit connected across the condenser, and temperature responsive resistance means in said discharging circuit whose resistance is variable in response to changes in temperature to vary the resistance of the discharging circuit to maintain the rate of discharge of said condenser constant.

4. Electromagnetic timing mechanism comprising an energizing winding, a direct current supply circuit for said winding, a condenser and a resistance element connected in series in said circuit, means for charging said condenser to energize said winding, a discharging circuit for said condenser, and means operable in response to energization of said winding to close said discharging circuit, to discharge said condenser and deenergize said winding, and in response to deenergization of said winding to open said discharging circuit.

5. Electromagnetic timing mechanism comprising a condenser, means for intermittently charging the condenser to a maximum voltage, an energizing winding having a supply circuit connected across the condenser, temperature responsive resistance means in said supply circuit whose resistance is variable in response to changes in temperature to vary the resistance of the supply circuit to maintain the rate of energization of said winding constant, a discharging circuit for said condenser, and means operable in response to energization of said winding to close said discharge circuit and to deenergization of said winding to open said discharge circuit.

6. An electrical timing device comprising a condenser, a charging and a discharging circuit for the condenser, electromagnetic means having an energizing winding connected into the discharging circuit, an armature connected to one side of the condenser, a resistance element connected to the other side of said condenser, a contact, said resistance being connected in series with the contact and condenser and said armature being movable into contact with said contact in response to a predetermined maximum energization of said winding and out of contact with said contact in response to a predetermined minimum energizaiton of said winding.

7. Electromagnetic timing mechanism comprising a first condenser, a direct current charging circuit for the first condenser, a direct current source of supply for said charging circuit, a discharging circuit connected across said first condenser and including a first energizing winding, means operable in response to energization of said first winding to open said discharging circuit and in response to deenergization of said first winding to close said discharging circuit, a second condenser connected to said first condenser to be charged thereby, a second energizing winding having a supply circuit connected across said second condenser, a discharge circuit for said second condenser, and means operable in response to energization of said second winding to close the discharging circuit of the second condenser and in response to deenergization of said second winding to open the discharge circuit of the second condenser.

8. Electromagnetic timing mechanism comprising a first condenser, a direct current charging circuit for the first condenser, a direct current source of supply for said charging circuit, a discharging circuit connected across said first condenser and including an energizing winding and temperature responsive means in said discharging circuit whose resistance is variable in response to changes in temperature to vary the resistance of the discharging circuit, means operable in response to energization of said winding to open said charging circuit and in response to deenergization of said winding to close said charging circuit, a second condenser connected to said first condenser to be charged therefrom, a second energizing winding having a supply circuit connected across said second condenser, temperature responsive means in said supply circuit whose resistance is variable in response to changes in temperature to vary the resistance of the supply circuit to maintain the rate of energization of said second winding constant, a discharge circuit for said second condenser, and means operable in response to energization of said second winding to close the discharge circuit of the second condenser and in response to deenergization of said second winding to open the discharge circuit of said second condenser.

9. An electrical timing device comprising a condenser, a direct current charging circuit and a discharging circuit connected across the condenser, a source of direct current for said charging circuit, means in said circuits for varying the rate of charging and discharging of the condenser, an energizing winding in said discharging circuit, temperature responsive resistance means in said discharging circuit for varying the resistance of the discharging circuit in response to changes in temperature to maintain the rate of discharge of the condenser at a selected rate, a load circuit connected to said source and having a relay coil and means closing said load circuit and movable in response to a predetermined energization of said winding to open said load circuit.

10. An electrical timing device comprising a condenser, a direct current charging circuit and a discharging circuit connected across the condenser, a source of direct current for said charging circuit, means in said circuits for varying the rate of charging and discharging of the condenser, an energizing winding in said discharging circuit, temperature responsive resistance means in said discharging circuit for varying the resistance of the discharging circuit in response to changes in temperature to maintain the rate of discharge of the condenser at a selected rate, a load circuit connected to said source and having a relay coil and means closing said load circuit and movable in response to a predetermined energization of said winding to open said load circuit, and responsive to de-energization of said winding to close said load circuit.

References Cited in the file of this patent

UNITED STATES PATENTS

| | | |
|---|---|---|
| 2,208,125 | Feingold | July 16, 1940 |
| 2,221,867 | Feingold | Nov. 19, 1940 |
| 2,258,575 | MacKay | Oct. 7, 1941 |
| 2,342,085 | MacKay | Feb. 15, 1944 |